Jan. 7, 1969 R. M. AVERILL, JR 3,420,961

TIME DIVISION KEY TELEPHONE SYSTEM

Filed June 1, 1965 Sheet 1 of 3

INVENTOR
R. M. AVERILL, JR.
BY Howard R Popper
ATTORNEY 3,420,961
Patented Jan. 7, 1969

3,420,961

TIME DIVISION KEY TELEPHONE SYSTEM

Robert M. Averill, Jr., Little Silver, N.J., assignor to Bell Telephone Laboratories, Incorporated, New York, N.Y., a corporation of New York Filed June 1, 1965, Ser. No. 460,123
U.S. Cl. 179—18 13 Claims
Int. Cl. H04m *3/00;* H04m *1/00*

ABSTRACT OF THE DISCLOSURE

A key telephone circuit for use with time division switching systems is disclosed. The key telephone circuit comprises two major equipment entities. The first entity is the time division switching line circuit that provides supervisory signals to the second entity, namely, the key service line circuit. The combined circuit arrangement forms a feedback memory circuit which controls the lamp drivers that operate at various winking rates to display the holding and other conditions of the line to the key telephone user.

Figures 1, 4:
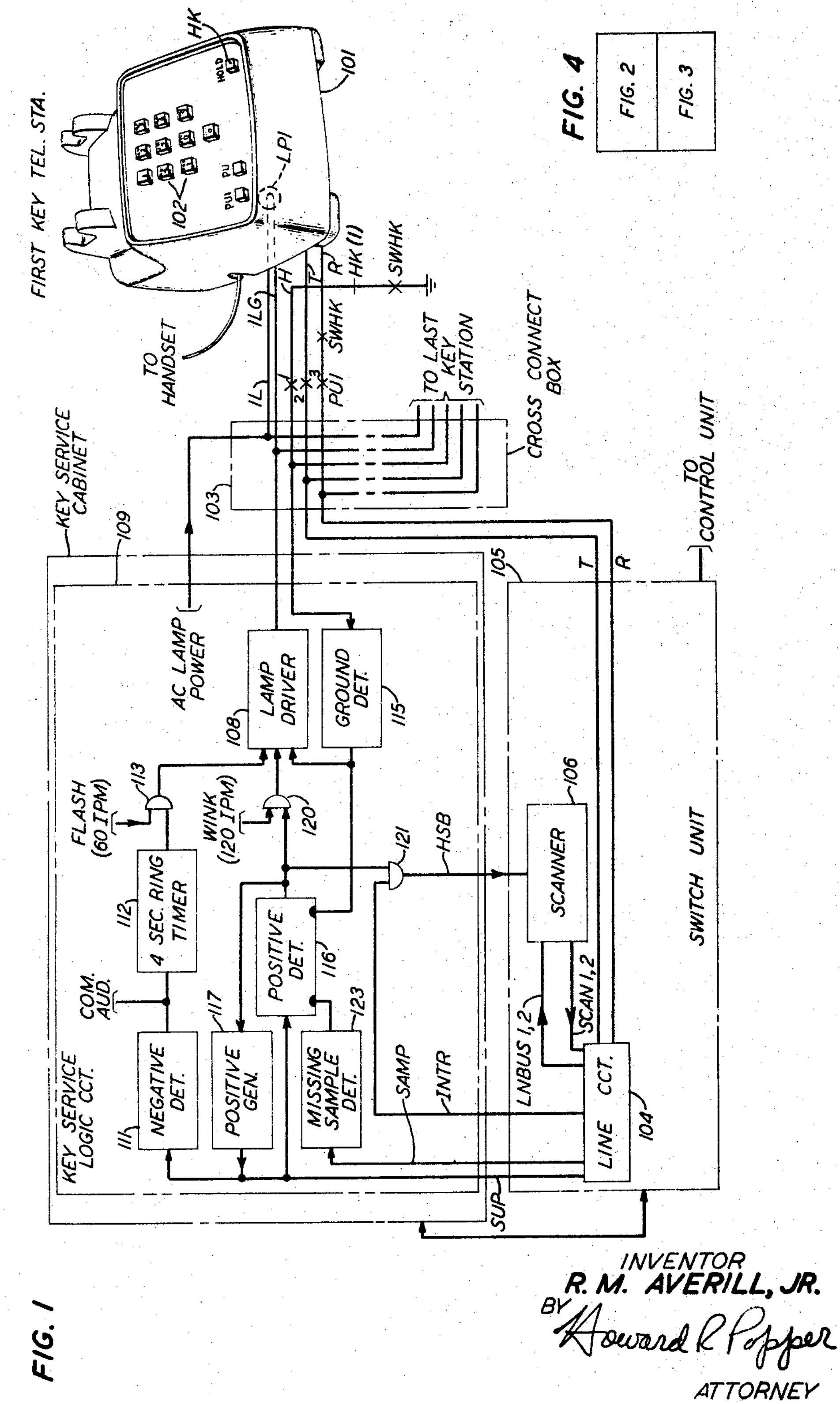

This invention relates to time division telephone switching systems and more particularly to the implementation of key telephone service in such systems.

In the copending application of R. C. Gebhardt et al. Ser. No. 195,199, filed May 16, 1962, now Patent No. 3,225,144, there is disclosed a time division telephone switching system wherein a number of telephone subscribers at a remotely located switch unit are accorded time division access to a talking bus common to all the subscribers at the switch unit. Each subscriber is equipped with a time division switch controlled by signals received from the centrally located control unit which serves a plurality of such switch units. The control unit administers these time division connections by maintaining information pertinent to each call in a temporary memory known as the call store. Each telephone at a switch unit is provided with a line circuit containing a transformer which isolates the battery feed for the subscriber's telephone from the A-C transmission path to the time division switches which establish an audio path to the common talking buses. The D-C state on the subscriber's telephone side of this isolating transformer is solely dependent upon the off-hook or on-hook state of the subscriber's telephone and is not at all related to the state of the time division switches or of any of the connections in the telephone office. In this regard, the line circuit of the time division telephone switching system herein referred to is readily distinguishable from the line circuits of conventional electromechanical telephone switching systems. The time division line circuit includes neither a line relay nor a cut-off relay and accordingly the D-C state of the loop to the subscriber's telephone does not convey to that telephone any information concerning the state of any other line.

In certain conventional systems, for example, the release of the cut-off relay re-inserting the battery and ground feed of the line relay in the loop circuit results in the transmission of reverse battery supervision over the line loop to the station. Such is not possible, however, in the time division line circuit.

When key telephone service is desired in a time division switching system such as the one hereinbefore mentioned, certain problems arise. While the call status store of the control unit contains adequate memory to control the state of the few supervisory lamps at a few attendant consoles (see particularly FIG. 13 of the above-mentioned Gebhardt et al. application), the amount of extra memory that would be necessary to control supervisory lamps at a plurality of key telephone stations is quite another matter. It does not appear to be economically feasible to generally provide increased call store capacity for just key telephone stations because while the absolute number of such stations may be considerable in any one particular installation, on the average such stations constitute but a small fraction of the total number of telephones handled by the average switch unit.

Accordingly, it is a general object of the present invention to improve the quality of key telephone service in time division switching systems without the need for unduly complicated common control equipment.

The foregoing object is achieved in accordance with the principles of the present invention, in one illustrative embodiment thereof, by monitoring the sampling of the time division gate and the off-hook, on-hook and ringing conditions of the key service line circuit. A feedback loop including a circuit for detecting the off-hook state of the line at the onset of the holding condition and a circuit for continuing to generate a signal representative of the off-hook state during the holding condition comprises a memory arrangement for controlling a display lamp at the key telephone. The feedback loop is closed incident to the operation of the hold key and opened either by the key station user picking up the line or by a circuit which monitors the time division sampling of the line. Upon release of the hold key, the tip and ring continuity of the line to the line circuit is opened. The feedback loop then returns a signal to the line circuit independently of the continuity of the tip and ring loop which signal synthesizes the off-hook state at the line circuit despite the fact that the tip and ring are actually open. The feedback loop memory, in turn, controls lamp drivers to operate at a winking rate to display the holding condition to the key telephone user. The memory is reset either by the station user picking up the line to change the signal on the hold lead or by the control unit responding to the abandoning of the call by the held party, in which case sampling of the time division switch of the key service line circuit is discontinued. A missing sample detector thereupon operates to break the feedback loop. The lamps are then illuminated to indicate the pick-up condition so that the key telephone user may restore the telephone to the on-hook condition.

It is an aspect of the foregoing circuitry that the existence of the holding condition be conveyed to the switch unit scanner by passing the normal scanner interrogate pulses to a hold scan bus through a gate controlled by the state of the above-mentioned feedback loop memory.

Accordingly, it is a feature of the present invention to indicate to a key service telephone in a time division telephone switching system the holding state of a telephone call even when the loop to the key telephone is open-circuited.

It is another feature of the present invention to artificially generate a closed loop indication in a line circuit of a time division switching telephone system associated with a key service telephone when that telephone is in the holding condition.

It is another feature of the present invention to provide a feedback loop memory arrangement which receives from the line circuit a supervisory state indicating an off-hook key telephone set and which responds to the application of the hold condition by that key telephone set to continue the application of the off-hook state during the continuance of the holding condition.

It is another feature of the present invention to interrupt the feedback loop memory when sampling of the time division switch of the holding key service telephone is discontinued incident to the abandoning of the call by the held party.

It is still another feature of the present invention to indicate to the switch unit scanner the holding condition of a key service telephone set by applying the scanner interrogate pulses to a holding scan bus over the path including a gate controlled by the aforementioned feedback loop memory.

Figure 2:
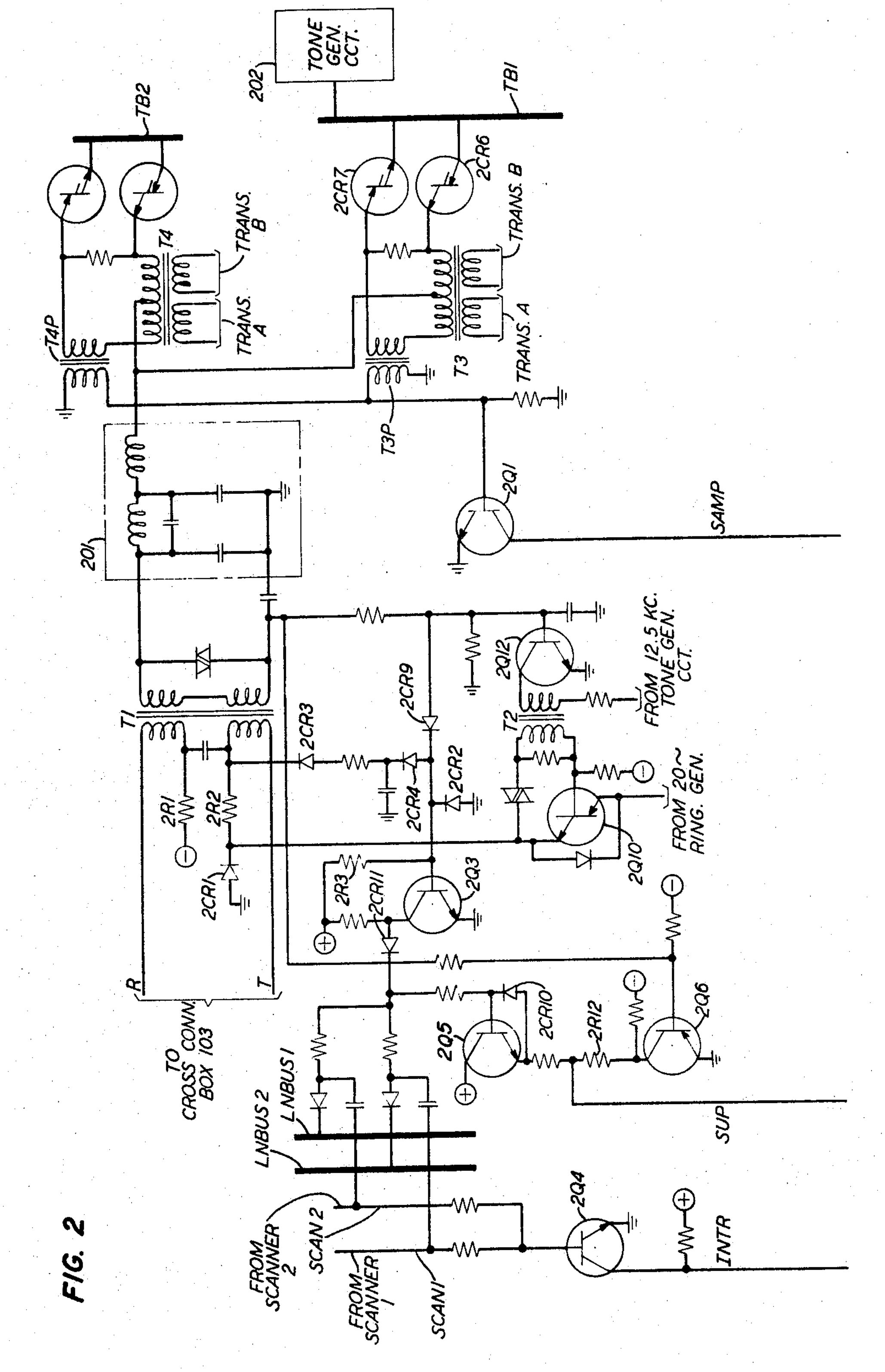
Figure 3:
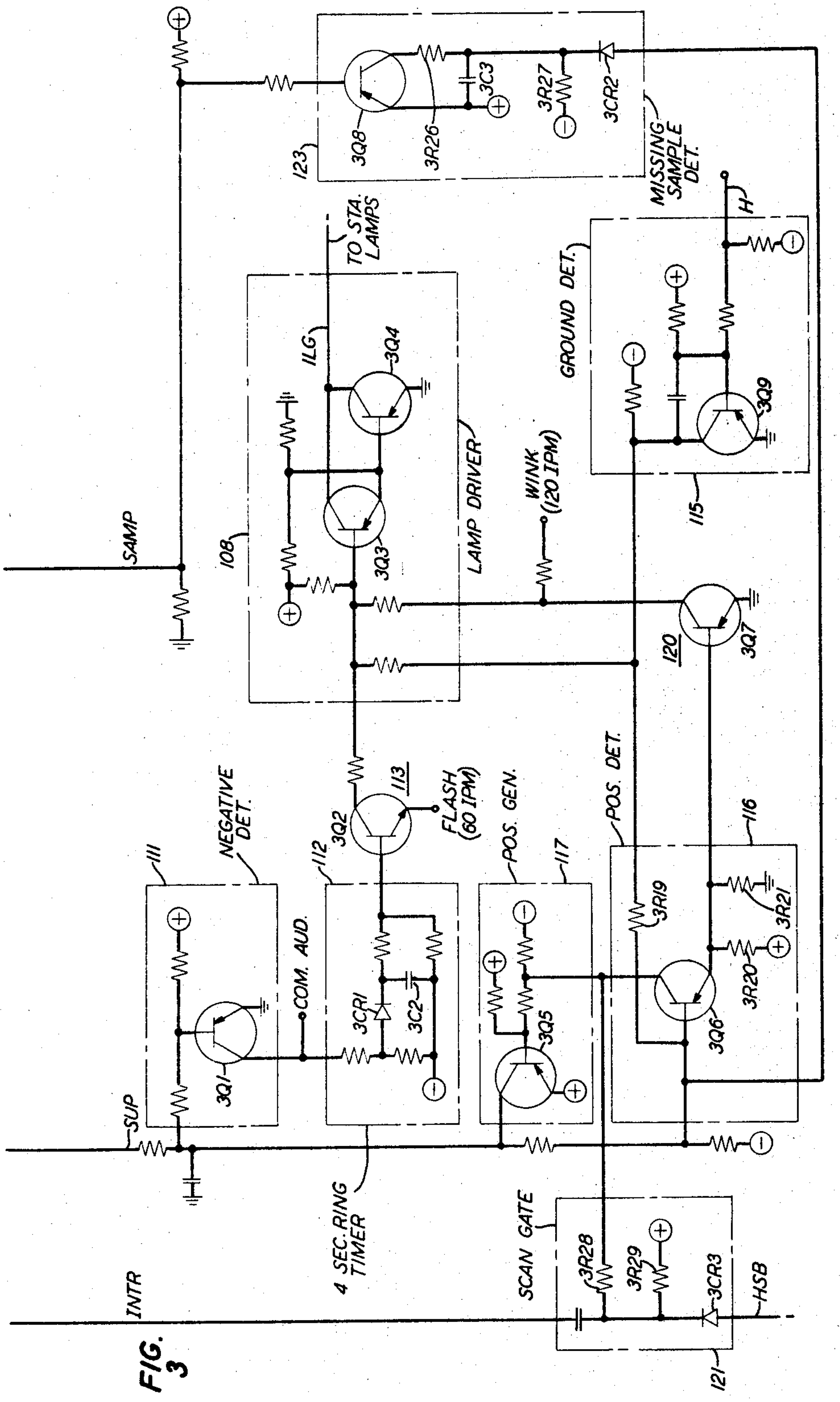

The foregoing and other features may become more apparent by referring now to the drawing in which:

FIG. 1 shows, in block diagram form, the time division telephone system of the present invention;

FIGS. 2 and 3, assembled in accordance with FIG. 4, show the details of an illustrative time division switching system line circuit and key service logic circuit in accordance with the principles of the present invention.

Referring now to FIG. 1, a key telephone set 101 is shown having a plurality of conventional call signaling pushbuttons 102, a plurality of line pick-up keys, only one of which, viz., pick-up key PU1, is shown for convenience, and a hold key HK. The pick-up key PU1 is illuminated by lamp LP1 so that the key telephone user may determine when that one of the plurality of lines, access to which is obtained by the operation of pick-up key PU1, is ringing, being held, or off-hook, as the case may be. The tip and ring leads T, R for the line, access to which is obtained by the operation of pick-up key PU1, are brought out to cross-connection box 103 from telephone set 101 and are connected therefrom to line circuit 104 of the time division telephone switching switch unit 105 in the usual manner. Lamp illumination leads 1L and 1LG are connected via cross-connection box 103 to lamp driver circuit 108 of key service logic circuit 109. Key service logic circuit 109 is one of a plurality of similar circuits advantageously provided at or close to the switch unit for each of the other equipped pick-up keys (not shown) of telephone 101. For each such other key service logic circuit (not shown) there will likewise be provided a respective line circuit in switch unit 105 similar to line circuit 104.

Let it be assumed that switch unit 105 is in the process of connecting a call to line circuit 104 in the manner generally described in the copending Gebhardt et al. application hereinbefore referred to. When line circuit 104 is instructed to apply ringing to the tip and ring conductors T, R, supervisory lead SUP will go negative, in the manner to be described hereinafter in further detail. Negative detector circuit 111 responds to this negative potential and activates the four-second ring interval timer 112. During the three-second silent period of the ringing interval, supervisory lead SUP will return to ground potential. Ring interval timer 112, however, will provide a constant enabling potential to flash gate 113 so that the source of 60 i.p.m. flashing signals will be applied to lamp driver 108. Accordingly, lamp LP1 illuminating pick-up key PU1 will flash at the 60 i.p.m. rate, alterting the key telephone user of the call. Line circuit 104 will apply audible ringing to leads T, R in the usual manner. When the subscriber removes the handset of telephone 101 from the switchhook cradle and operates pick-up key PU1 (or when one of the other key telephones, not shown in detail, associated with the line circuit 104 is so operated), hold lead H is grounded over the path including switchhook make contact SWHK, break contact HK(1) of the hold key, and make contact PU1(1). The ground potential appearing on hold lead H is detected by ground detector 115 which in turn controls lamp driver 108 to steadily illuminate lamp LP1. Substantially simultaneously therewith, continuity is established between the tip and ring conductors T, R by telephone set 101, and line circuit 104 responds to this off-hook condition to trip ringing and to apply positive potential to supervisory lead SUP. At this time, the output of ground detector 115 keeps positive detector circuit 116 inhibited and prevents positive detector circuit 116 from responding to the positive potential on supervisory lead SUP.

Let it now be assumed that the key telephone user desires to place this call on hold and accordingly depresses hold key HK. The operation of hold key HK, at its operated break contact HK(1), removes ground from hold lead H. Ground detector 115 thereupon removes an inhibit signal from positive detector 116. The output of positive detector circuit 116 thereupon activates positive generator circuit 117 which in turn applies a positive potential to supervisory lead SUP in such a manner that positive detector circuit 116 continues to have applied to its input from supervisory lead SUP the same positive potential which it experienced prior to the operation of hold key HK. When hold key HK is released, the conventional mechanical interlock arrangement in key telephone set 101 releases pick-up key PU1 which, at its release make contacts PU1(2, 3), open-circuits the tip and ring loop to line circuit 104. Line circuit 104 then removes positive potential from supervisory lead SUP but positive detector 116 continues to have the same positive potential applied to its input by positive generator 117. Positive detector 116 and positive generator 117 at this time comprise a feedback loop memory indicative of the holding condition. At this time, the output of positive detector 116 enables wink gate 120 to apply 120 i.p.m. winking potential to lamp driver 108 which causes lamp LP1 to be illuminated at the wink rate indicative of the holding condition of its associated line.

The holding condition established by the operation of hold key HK of key telephone set 101 is transmitted to the control unit via the switch unit. The switch unit ascertains that line circuit 104 has been placed in the holding condition for this purpose in the following manner: Switch unit scanner 106 applies scanning pulses to line circuit 104 over leads SCAN 1, 2 in the conventional manner. These pulses are applied by the line circuit to lead INTR. As previously mentioned, the output of positive detector 116 is activated during the holding interval. This output enables scan gate 121 to pass the scanning pulses on lead INTR to bus HSB. Bus HSB is a bus which is scanned by scanner 106 to detect the holding condition of lines in similar manner to that in which line buses LNBUS 1, 2 are scanned to detect the off-hook, on-hook condition of lines. Basically, scanner 106 has an address counter which is incremented to deliver a scanning pulse on a scan lead individual to each line circuit. If the line is off-hook when the pulse is delivered to its scan lead, the line circuit returns a positive pulse to the line bus. Similarly, if the line is in the holding condition when the pulse is delivered to its scan lead, a negative pulse is applied to the holding bus HSB which is common to all key service lines.

The scanner will accordingly be provided with an additional bit of memory to reflect the state of bus HSB. The scanner will contain additional logic circuitry (not shown) to inform the control unit whether the line is off-hook, holding, or on-hook, in acocrdance with the states of the last look bit, present state bit, and state of bus HSB bit, according to the conditions set forth in Table I.

TABLE I.—SCANNER LOGIC TABLE

| (a) Last look | (b) Pres. state | (c) Hold bus | Up-date last look To— | Message to CU | Status of telephone 101 |
|---|---|---|---|---|---|
| 0 | 0 | 0 | ---- | ---- | On hook. |
| 0 | 1 | 0 | 1 | Off hook | Off hook. |
| 1 | 1 | 0 | ---- | ---- | Do. |
| 1 | 1 | 1 | 0 | Hold | Holding. |
| 0 | 1 | 1 | ---- | ---- | Do. |
| 1 | 0 | 0 | 0 | On hook | On hook. |

NOTE.—In columns (a) and (b), 1=off-hook state. In column (c), 1=holding condition.

The line remains in the holding state until picked up by reoperation of pick-up key PU1 of telephone 101 or of one of the similar keys of the other telephones (not shown in detail) associated with the same line. The holding state can also be removed if the call is abandoned by the held party. If the line is picked up by the operation of pick-up key PU1, hold lead H is grounded and ground detector 115 operates. Ground detector 115 operated inhibits positive detector 116 and causes lamp driver 108 to provide steady lamp illumination to lamp LP1 in lieu of the 120 i.p.m. wink signal that it had been providing during the holding condition. Positive detector 116 so inhibited removes its enabling output from scan gate 121 thereby preventing scanning pulses from being applied to bus HSB. In addition, positive generator 117 is no longer enabled. However, the operation of pick-up key PU1, at its make contacts PU1 (2, 3), re-establishes continuity between tip and ring conductors T, R in response to which line circuit 104 reapplies positive potential to the supervisory lead SUP. Since lamp LP1 is steadily illuminated, the key station user determines that his line is merely off-hook and may dial to initiate a new call or may restore the switchhook to normal. Ground detector 115 is advantageously made "slow to release" so that it continues to provide an inhibit signal to positive detector 116 for a sufficiently long interval to assure that line circuit 104 will change the potential of supervisory lead SUP from positive to ground after the switchhook is restored to normal. This will avoid any possibility of erroneous operation of positive detector 116 after station 101 disconnects.

If, instead of the holding condition being terminated by the operation of pick-up key PU1, the held party abandons the call, the following operations take place. The control unit recognizes that the held party has gone on-hook, in the manner generally described in the above-mentioned copending Gebhardt et al application. In accordance with the stored program contained in the control unit, time division sampling of the time divisions switch associated with the held party (not shown) is discontinued. Similarly, switch unit 105 is instructed to discontinue the time division sampling of the time division switch in line circuit 104 associated with the holding party, viz., telephone 101. Missing sample detector 123 recognizes the absence of time division sampling pulses on lead SAMP and provides an output to inhibit positive dettector 116. Positive detector 116 so inhibited disables scan gate 121, preventing scanning pulses from reaching bus HSB, removes its output from the input of positive generator 117 and from the input of wink gate 120, as before.

The indications sent from the switch unit to the control unit when the holding condition is recognized by scanner 106 cause the control unit to erase the address of the held line from the time slot. This is required because the trunks advantageously employed in the illustrative time division switching system require idle circuit termination when held to avoid "singing." The trunks must be terminated because the continuity of the tip and ring conductors of the holding line will be interrupted during the continuance of the holding condition. The control unit does not erase the address of the holding line so that sampling pulses will continue to be delivered to its time division switch. As explained hereinafter, however, by slight modification of the detailed circuitry of the line circuit 104 and key service logic circuit 109, the control unit may be allowed to be programmed to erase the address of the holding line as well as the address of the held line. Accordingly, no sampling pulses are delivered to the line circuit during the continuance of the holding condition. The reappearance of sampling pulses at the termination of the hold state (whether caused by operation of pick-up key PU1 or by the held party abandoning the call) would be utilized for disabling positive detector 116 and hence scan gate 121. In either case, when the control unit recognizes the re-establishment of an off-hook condition following a holding condition, the address of the held line is rewritten into the time slot so that idle circuit termination is removed from the trunk.

Referring now to FIG. 2, there are shown the major components of the line circuit 104 and a portion of the interconnections with key service logic circuit 109, the latter being shown more fully in FIG. 3. The tip and ring leads from station 101 and cross-connection box 103 are connected to the line side of transformer T1. Transformer T1 matches the balanced line to the unbalanced time division switch network comprising talking buses TB1 and TB2. The line (left-hand) side circuitry of transformer T1 includes resistors 2R1 and 2R2, diode 2CH1, and battery and ground supplied for the line. When a time division connection is to be established, the switch unit A or B translator (not shown) activates a respective winding of one of pulse transformers T3 or T4 depending on whether talking bus TB1 or talking bus TB2 is to be employed. Whether the A or B translator is used in a particular call depends upon whether the associated line is a calling or a called line.

The time division transmission circuit when employing talking bus TB1, for example, includes the loop network from telephone 101, line transformer T1, a low-pass filter 201, and a pair of fast switching diodes 2CR6 and 2CR7. The fast switching diodes are the time division switches which, when enabled by pulse transformer T3, permit a communications connection to be established from telephone 101 to any of the telephones (not shown) connected by their respective time division switches (not shown) to talking bus TB1. Similarly, pulse transformer T4 when enabled by either TRANS A or TRANS B can connect telephone 101 to talking bus TB2. During the continuance of a time division connection, the respective pulse transformer T3 or T4 will be pulsed at a 12.5 kc. sampling rate. Pick-up transformers T3P and T4P, respectively, detect the sampling of their associated time division switches and turn on transistor 2Q1 each time a sampling pulse is provided to either of the time division switches. When transistor 2Q1 is gated on, it applies a ground pulse to lead SAMP.

When station 101 is on-hook and not being rung, the base of transistor 2Q3 is provided enabling current through its base resistor 2R3. Diode 2CR2 is back biased since there is not potential drop across resistor 2R2 in the ground feed at the line side of transformer T1. While transistor 2Q3 is conducting, scan pulses appearing on either of leads SCAN 1, 2 are prevented from being passed through the scan bus diodes which are back biased by this transistor. When station 101 goes off-hook, continuity is established between conductors T and R and diodes 2CR3, 2CR4, and 2CR2 are forward biased by the negative potential developed across resistor 2R2. Transistor 2Q3 is turned off by diode 2CR2 conducting. When transistor 2Q3 is turned off, scan pulses applied to scan leads SCAN 1, 2 are coupled to the respective one of line buses LNBUS 1, 2. The scanner interprets the presence of a pulse on the line bus as indicating the off-hook condition of the line whose address (in the scanner address counter, not shown) resulted in its respective scan lead being pulsed.

Transistor 2Q5 is on when transistor 2Q3 is off and vice versa. Transistor 2Q6 is normally conducting because of the biasing arrangement connected to its base. Accordingly, when telephone 101 is on-hook, transistor 2Q5 is off and transistor 2Q6 is on. Transistor 2Q6 in the on condition shunts down the resistance battery at the lower end of resistor 2R12 and maintains supervisory lead SUP at ground potential. When telephone 101 goes off-hook, transistor 2Q3 is turned off and transistor 2Q5 is turned on, the base-emitter junction of transistor 2Q5 being forward biased because of the positive potential at the collector of transistor 2Q3 and ground potential at the collector of transistor 2Q6. Transistor 2Q5 in the on state raises the potential of supervisory lead SUP to a positive value.

When the line circuit is in the holding condition, tip and ring leads are open and hence transistor 2Q3 is conducting. The line would appear on-hook if it were not for the positive potential fed back from the key service logic circuit to the line circuit via the SUP lead during the hold condition. This positive potential will cause diode 2CR10 to conduct, raising the cathode potential of back biased diode 2CR11 to a positive potential. Scanner interrogate pulses will hence be coupled onto the LNBUS leads causing the line to appear to be off-hook even though tip and ring are open.

The time division switch diodes 2CR6, 7 of talking bus TB1, for example, are not designed to pass ringing power. Accordingly, pnpn transistor 2Q10, when gated on by transformer T2, connects ringing current from a 20-cycle generator to the tip side of the line. A positive D-C potential originating in tone generating circuit 202 is time-division connected to talking bus TB1 during the ringing interval and this potential finds its way through the respective time division switch diode 2CR6, for example, the center tap connecton of pulse transformer T3, and the switching network side winding of transformer T1, to the base of transistor 2Q12, turning it on. With transistor 2Q12 conducting pnpn transistor 2Q10 is also turned on, the 12.5 kc. tone applied to the primary winding of transformer T2 in series with transistor 2Q12 being applied to the secondary of transformer T2 to the base-emitter circuit of transistor 2Q10. Transistor 2Q10 being turned on connects 20-cycle ringing to the line. During the active phase of the ringing interval, the positive potential originating in tone generating circuit 202 which is applied to the base of transistor 2Q12 is also applied to the base of transistor 2Q6, turning it off. When transistor 2Q6 is turned off, it no longer shunts down the resistance battery at the bottom of resistor 2R12 and lead SUP experiences negative potential until station 101 is placed in the off-hook condition.

The remaining elements of the key service logic circuit are shown in detailed form in FIG. 3. When telephone station 101 is on-hook, supervisory lead SUP is at ground potential, transistor 3Q1 is off, and negative detector circuit 111 is not enabled. The positive scan pulses applied in FIG. 2 to leads SCAN 1 or SCAN 2 are reflected by transistor 2Q4 as ground pulses on lead INTR. These ground pulses are not effective to forward bias diode 3CR3 of scan gate 121, and accordingly no pulses are passed to hold scan bus HSB.

When ringing is applied by line circuit 104, the potential of supervisory lead SUP swings to a negative value during the active phase of the ringing interval and forward biases transistor 3Q1 of negative detector circuit 111. The collector of transistor 3Q1 is advantageously provided with a tap point designated COM. AUD. so that common audible ringing may be provided by auxiliary circuitry, not shown. This common audible ringing circuitry would take the form of an OR gate (not shown) each of whose plurality of inputs is connected to the corresponding COM. AUD. point of a key service logic circuit similar to circuit 104, that would be provided in the usual multiline key telephone installation. The output of the OR gate would control the application of the source of audible ringing to the key station ringer.

When transistor 3Q1 is turned on by the negative potential appearing on lead SUP, the negative battery of the four-second ring interval timer 112, which back biases the base of flash gate transistor 3Q2, is shunted down and capacitor 3C2 charges through diode 3CR1. When the negative potential is removed from lead SUP, the charge on capacitor 3C2 maintains flash gate transistor 3Q2 conducting. The emitter of flash gate transistor 3Q2 is connected to a 60 i.p.m. negative source.

So long as station 101 remains on-hook the 60 i.p.m. negative source is applied to the base of transistor 3Q3 of lamp driver 108 and the 60 i.p.m. signal is repeated, as 60 i.p.m. ground, by transistors 3Q3 and 3Q4 to lead 1LG. When station 101 is taken off-hook to answer ringing, hold lead H is grounded, turning off normally-on transistor 3Q9 of ground detector circuit 115. Transistor 3Q9 in turning off substitutes a steady negative potential for the 60 i.p.m. negative signal priorly applied to the base of transistor 3Q3, and this transistor and transistor 3Q4 accordingly supply steady lamp illuminating ground to lead 1LG. Simultaneously, ground detector circuit 115 applies negative potential to the base of transistor 3Q6 of positive detector circuit 116, maintaining this transistor on. Transistor 3Q6 in the on condition maintains transistor 3Q5 of positive generator circuit 117 biased off. It should be noted that transistor 3Q6 is maintained on by the negative potential from ground detector circuit 115 at this time even though supervisory lead SUP is positive because telephone 101 is off-hook. Transistor 3Q6 conducting maintains diode 3CR3 of scan gate 121 back biased, and accordingly no pulses are delivered to hold scan bus HSB.

Should the key telephone user at station 101 operate hold key HK (FIG. 1), ground will be removed from hold lead H thereby turning on transistor 3Q9. Transistor 3Q9 turning on applies ground to the right-hand side of resistor 3R19 in the base circuit of transistor 3Q6. The positive potential appearing on supervisory lead SUP is therefore effective to back bias the base-emitter junction of transistor 3Q6 and turn it off. When transistor 3Q6 turns off, transistor 3Q5 is turned on and, at its collector, maintains supervisory lead SUP at the potential of the positive battery connected to the emitter of this transistor. The negative potential at the collector of transistor 3Q6 (obtained from the resistance source in circuit 117) is now effective to forward bias diode 3CR3 of scan gate 121, and accordingly the pulses applied to lead INTR are coupled to hold scan bus HSB.

Transistor 3Q6 in being turned off causes transistor 3Q7 of wink gate 120 to be back biased and turned off so that it no longer shunts down the 120 i.p.m. negative wink source. Accordingly, 120 i.p.m. negative wink pulses are applied to the base of transistor 3Q3 and this transistor and transistor 3Q4 in turn apply 120 i.p.m. lamp illuminating ground to lead 1LG.

During the continuance of the holding condition as well as during the continuance of a talking condition, time division switch diodes 2CR6 and 2CR7 of talking bus TB1 (FIG. 2), for example, are operated by pulse transformer T3. The application of these sampling pulses is detected by a pick-up winding of transformer T3A which gates on transistor 2Q1. Transistor 2Q1 when gated on delivers ground pulses to sampling lead SAMP. Transistor 3Q8 of missing sample detector circuit 123 is gated on by the negative-going portion of the sampling pulses. So long as transistor 3Q8 continues to be so turned on, diode 3CR3 is back biased. The positive potential appearing on supervisory lead SUP, which maintains transistor 3Q6 of the positive detector circuit 116 back biased, remains undisturbed. If a sampling pulse is not applied to lead SAMP for an interval longer than that determined by the time taken for capacitor 3C3 to discharge, diode 3CR2 will be permitted to conduct thereby forward biasing the base-emitter junction of transistor 3Q6. When transistor 3Q6 is so turned on, transistor 3Q5 of positive generator circuit 117 is turned off thereby removing positive potential from supervisory lead SUP. Transistor 3Q6 in turning on back biases diode 3CR3 of scan gate 121 preventing any interrogate pulses from being applied to hold scan bus HSB. When transistor 3Q6 of positive detector 116 is so turned on, transistor 3Q7 of wink gate 120 is also turned on shunting down the 120 i.p.m. negative wink source. Accordingly, wink signals are no longer delivered to the input of lamp driver 108. When the positive potential formerly applied to supervisory lead SUP is removed by the inhibiting of positive generator circuit 117, supervisory lead SUP returns to ground potential because the continuity of the tip and ring leads to station 101 having been broken by the prior operation and release of hold key HK reflects the on-hook condition of supervisory transistor 2Q3 (FIG. 2). Accordingly, when the sampling of a holding line ceases, the lamp illuminating the pick-up key for that line will be extinguished.

The removal of a sampling pulse from lead SAMP, as just described, may be occasioned by the control unit recognizing that the held party has abandoned the call.

As described in the above-mentioned copending Gebhardt et al. application, the control unit will erase the address of the holding party as well as that of the held party from the time slot under these circumstances. Erasing the address of a line from the time slot has the effect of stopping the energization of its time division switch connecting that station with the talking bus.

Instead of removing sampling incident to the abandonment of the call, sampling might with equally advantageous results have been removed incident to the establishment of the holding condition. Whether sampling is removed upon the establishment or upon the abandonment of the holding condition is a choice to be made in the programming of the control unit. To accommodate the key service logic circuit for operation with a control unit in which sampling of the time division switches is controlled to be stopped upon the establishment of the holding condition, some minor changes obvious to those skilled in the art will be necessary. Briefly, these changes may advantageously be accomplished by inserting an npn transistor circuit in place of diode 3CR2. The base of the npn transistor would be capacitor coupled to the junction of resistor 3R27 and capacitor 3C3, and the collector of the transistor would be connected to the base of transistor 3Q6. Capacitor 3C5 coupling the collector and base of transistor 3Q9 would be removed therefrom and connected to couple the collector and base of transistor 3Q6. In this manner the reappearance of sampling pulses incident to the abandonment of the holding condition would be employed to remove 120 i.p.m. illumination from the pick-up keys, remove positive potential from the supervisory lead, and inhibit the application of interrogate pulses to hold scan bus HSB. Further and other modifications may be obvious to those skilled in the art.

It is to be understood that the above-described arrangements are illustrative of the application of the principles of the invention. Numerous other arrangements may be devised by those skilled in the art without departing from the spirit and scope of the invention.

What is claimed is:

1. A time division key telephone switching system having a line circuit comprising first means for detecting signals representing the off-hook and on-hook states of an associated key service telephone, second means for detecting a holding condition request signal from said telephone, means responsive to said first and said second detecting means for generating lamp illumination signals respectively indicative of the off-hook and holding states of said telephone, and means responsive to the time division sampling of said line circuit for controlling said first detecting means during said holding condition.

2. A time division key telephone switching system having a line circuit comprising means for detecting a supervisory signal indicative of the off-hook and on-hook states of an associated key service telephone, means responsive to a hold request from said key service telephone for generating lamp illumination signals indicative of the holding state of said telephone, and means responsive to the time division sampling of said line circuit for controlling said detecting means during said holding condition.

3. A telephone switching system having a central control unit and an outlying time division switch unit, a key telephone station having display means for indicating the existence of the off-hook, ringing, and holding conditions of a key service line accessible to said station, characterized in that the switch unit includes a first means for generating an indication of an off-hook condition incident to the establishment of the holding condition of said key service line and for continuing said off-hook indication while said line is in the holding condition, and second means for controlling said first means in accordance with the time division sampling of said line circuit.

4. A telephone second switching system according to claim 3 further characterized in that said second means is normally inhibited, and third means responsive to the establishment of said holding condition for rendering said second means responsive to said time division sampling.

5. A time division telephone system having a telephone line circuit, a plurality of key telephone sets having keybutton access to said line circuit, means for time sampling said line circuit when any of said key telephone sets is in the talking condition, first means controlled by the operation of a key of any of said telephone sets for disconnecting said set from said line circuit, second means controlled by the operation of said key for indicating a holding condition at said key telephone set, means for continuing said time sampling after said set is disconnected, and means responsive to the cessation of said time sampling for canceling said indication of said holding condition.

6. A time division telephone system according to claim 5 wherein said means for continuing said time sampling includes means at said line circuit for generating an off-hook signal during the time said set is disconnected from said line circuit.

7. A time division telephone system according to claim 5 wherein said second means controlled by said key includes means for detecting an off-hook signal while said set is disconnected from said line circuit.

8. A time division telephone system according to claim 6 wherein said off-hook signal generating means includes means responsive to the off-hook condition of said telephone set incident to the operation of said key, and memory means for storing said off-hook condition after said set is disconnected from said line circuit.

9. A time division telephone system according to claim 8 wherein said memory means is controllable in accordance with the time division sampling of said line.

10. In a time division telephone system having a time sampled line circuit, a key telephone set controllable to place said line circuit in the holding condition, means for detecting said holding condition, and means responsive to the time sampling of said line circuit for controlling said detecting means.

11. A time division telephone system comprising a key telephone set, means for detecting a closed loop condition of said set, means for placing said set in a hold condition, and means for artificially generating a closed loop condition for said set when said set is in the hold condition.

12. A time division telephone system in accordance with claim 11 wherein said means for artificially generating said closed loop condition includes a feedback loop memory arrangement responsive to an initial closed loop condition of said set and to said means for placing said set in said hold condition.

13. A time division telephone system in accordance with claim 12 further comprising means for interrupting said feedback loop memory arrangement on abandoning of a call by a held party.

References Cited

UNITED STATES PATENTS 3,239,610 3/1966 Morse et al. ---------- 179—18

KATHLEEN H. CLAFFY, *Primary Examiner.*

A. H. GESS, *Assistant Examiner.*

U.S. Cl. X.R.

179—99

PO-1050
(5/69)

UNITED STATES PATENT OFFICE
CERTIFICATE OF CORRECTION

Patent No. 3,420,961 Dated January 7, 1969

Inventor(s) Robert M. Averill, Jr.

It is certified that error appears in the above-identified patent and that said Letters Patent are hereby corrected as shown below:

Column 10, line 3, delete the word "second".

SIGNED AND
SEALED
NOV 18 1969

(SEAL)
Attest:

Edward M. Fletcher, Jr.
Attesting Officer

WILLIAM E. SCHUYLER, JR.
Commissioner of Patents